US010369854B2

(12) United States Patent
Klinger et al.

(10) Patent No.: US 10,369,854 B2
(45) Date of Patent: Aug. 6, 2019

(54) DEVICE FOR ADJUSTING A CAMBER AND/OR TOE OF A VEHICLE WHEEL

(71) Applicant: AUDI AG, Ingolstadt (DE)

(72) Inventors: Thomas Klinger, Ingolstadt (DE); Vincent Pourroy-Solari, Thones (FR)

(73) Assignee: Audi AG, Ingolstadt (DE)

( * ) Notice: Subject to any disclaimer, the term of this patent is extended or adjusted under 35 U.S.C. 154(b) by 207 days.

(21) Appl. No.: 15/329,169

(22) PCT Filed: Jul. 2, 2015

(86) PCT No.: PCT/EP2015/001344
§ 371 (c)(1),
(2) Date: Jan. 25, 2017

(87) PCT Pub. No.: WO2016/015808
PCT Pub. Date: Feb. 4, 2016

(65) Prior Publication Data
US 2017/0225531 A1 Aug. 10, 2017

(30) Foreign Application Priority Data
Jul. 26, 2014 (DE) ........................ 10 2014 011 193

(51) Int. Cl.
*B60G 7/00* (2006.01)
*B62D 17/00* (2006.01)
*B60G 17/015* (2006.01)

(52) U.S. Cl.
CPC ............ *B60G 7/006* (2013.01); *B60G 7/005* (2013.01); *B60G 17/0157* (2013.01);
(Continued)

(58) Field of Classification Search
CPC ..... B60G 7/006; B60G 2200/46; B62D 17/00
(Continued)

(56) References Cited

U.S. PATENT DOCUMENTS

| 4,828,279 A | 5/1989 | Matschinsky |
| 5,009,447 A | 4/1991 | Gabel |
(Continued)

FOREIGN PATENT DOCUMENTS

| CN | 102300726 A | 12/2011 |
| CN | 102656031 A | 9/2012 |
(Continued)

OTHER PUBLICATIONS

Heissing, Bernd: Fahrwerkhandbuch, 3., Wiesbaden: Vieweg + Teubner, 2011, ISBN 978-3-8348-0821-9 and English translation thereof.

(Continued)

*Primary Examiner* — Faye M Fleming
(74) *Attorney, Agent, or Firm* — Henry M. Feiereisen LLC

(57) ABSTRACT

A device for adjusting camber and/or toe of a vehicle wheel includes a multi-part wheel carrier having a wheel-side carrier part, an axle-side guide part, and an adjusting member, in particular two rotary parts, arranged there between, by which the carrier part is swingable about a wobble point for toe and/or camber adjustment of the vehicle wheel. A bearing point is formed radially outside of the adjusting member, on which the carrier part and the guide part are articulated to one another. The bearing point is designed in a firm manner in the wheel-axle circumferential direction for support of the carrier part which is subjected to a brake torque, and is designed in a soft manner to realize a trouble-free adjustment and, compared with the wheel-axle circumferential direction, a particularly smooth adjustment of the carrier part about the toe and/or camber angle in the vehicle transverse direction.

20 Claims, 3 Drawing Sheets

(52) U.S. Cl.
CPC .......... B62D 17/00 (2013.01); *B60G 2200/46* (2013.01); *B60G 2200/462* (2013.01); *B60G 2202/40* (2013.01); *B60G 2202/42* (2013.01); *B60G 2202/442* (2013.01); *B60G 2204/4104* (2013.01); *B60G 2206/50* (2013.01)

(58) Field of Classification Search
USPC .................................................. 280/86.751
See application file for complete search history.

(56) References Cited

U.S. PATENT DOCUMENTS

| | | | |
|---|---|---|---|
| 2004/0160033 | A1 | 8/2004 | Kawarnata |
| 2007/0080513 | A1* | 4/2007 | Osterlanger ............. B60G 3/26 |
| | | | 280/86.751 |
| 2010/0078910 | A1 | 4/2010 | Mueller et al. |
| 2014/0054871 | A1 | 2/2014 | Jakob |
| 2017/0210422 | A1* | 7/2017 | Schmid .................. B60G 7/006 |
| 2017/0217492 | A1* | 8/2017 | Klinger ............. B60G 17/0152 |

FOREIGN PATENT DOCUMENTS

| | | |
|---|---|---|
| CN | 102656032 A | 9/2012 |
| DE | 2035 307 | 7/1970 |
| DE | 37 14 034 C1 | 4/1987 |
| DE | 196 13 212 A1 | 10/1997 |
| DE | 10 2004 049 296 A1 | 4/2006 |
| DE | 10 2008 048 567 A1 | 3/2010 |
| DE | 10 2008 048 568 A1 | 3/2010 |
| DE | 10 2009 006 903 A1 | 8/2010 |
| DE | 10 2009 058 489 A1 | 6/2011 |
| DE | 10 2009 058 490 A1 | 6/2011 |
| DE | 10 2011 007 283 A1 | 10/2012 |
| DE | 10 2012 206 337 A1 | 10/2013 |
| WO | WO 2005/047030 A1 | 5/2005 |
| WO | WO2005/047030 A1 | 5/2005 |

OTHER PUBLICATIONS

International Search Report issued by the European Patent Office in International Application PCT/EP2015/001344.

Chinese Search Report dated Jun. 5, 2018 with respect to counterpart Chinese patent application 2015800412837.

Translation of Chinese Search Report dated Jun. 5, 2018 with respect to counterpart Chinese patent application 2015800412837.

* cited by examiner

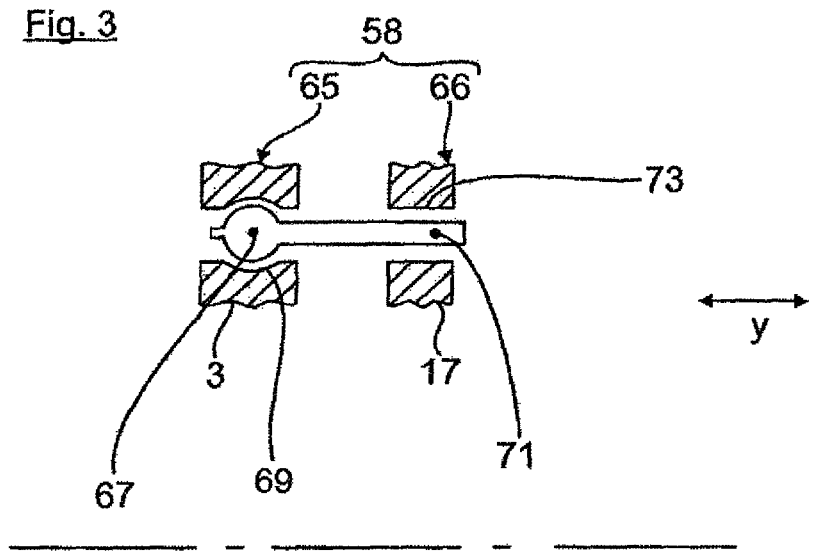

DEVICE FOR ADJUSTING A CAMBER AND/OR TOE OF A VEHICLE WHEEL

CROSS-REFERENCES TO RELATED APPLICATIONS

This application is the U.S. National Stage of International Application No. PCT/EP2015/001344, filed Jul. 2, 2015, which designated the United States and has been published as International Publication No. WO 2016/015808 and which claims the priority of German Patent Application, Serial No. 10 2014 011 193.8, filed Jul. 26, 2014, pursuant to 35 U.S.C. 119(a)-(d).

BACKGROUND OF THE INVENTION

The invention relates to a device for adjusting camber and/or toe of a motor vehicle wheel according to the preamble of patent claim 1.

DE 10 2009 058 489 A1 discloses a generic device in which a wheel carrier for a vehicle wheel is designed in several parts, that is with a wheel-side carrier part and an axle-side guide part as well as rotary parts arranged there between. Integrated in the wheel-side carrier part is a wheel bearing in which a wheel hub portion of a wheel flange, supporting the vehicle wheel, is rotatably mounted. The control arms of the wheel suspension of the vehicle can be articulated to the axle-side guide part. The rotary parts arranged there between interact with slanted surfaces that define a rotation axis of the wheel-side rotary part, which rotation axis is inclined in relation to the rotation axis of the axle-side rotary part. In this way, when a rotary drive is involved, at least one of the rotary parts is able to pivot the wheel-side rotary part for toe or camber adjustment of the Vehicle wheel about a wobble point.

In a braking operation, the brake caliper generates a braking torque which is conducted via the wheel carrier to the vehicle body, so that there is the risk that the camber and/or toe behavior of the wheel carrier is inadvertently affected. To avoid introduction of the braking torque into both rotary parts, the wheel-side carrier part is supported in the DE 10 2009 058 489 A1 via a space-intensive torque bridge, i.e. a cardan joint, upon the axle-side guide part.

SUMMARY OF THE INVENTION

The object of the invention is to provide a device that is both easy to manufacture and can be realized sufficiently stiff with respect to encountered wheel forces.

The object is achieved by a device for adjusting camber and/or toe of a vehicle wheel of a motor vehicle, including a wheel carrier, which is composed in multiple pieces with a wheel-side carrier part and an axle-side guide part as well as with an adjusting member, in particular two rotary parts, arranged there between, by which the wheel-side carrier part is swingable about a wobble point for toe and/or camber adjustment of the vehicle wheel, wherein the wheel-side carrier part supports a brake caliper that interacts with a brake disc of the vehicle wheel, wherein a bearing point is formed radially outside of the adjusting member, on which the carrier part and the guide part are articulated to one another, and wherein the bearing point is designed in a firm manner in the wheel-axle circumferential direction for support of the carrier part which is subjected to a brake torque, and is designed in a soft manner to realize a trouble-free adjustment and, compared with the wheel-axle circumferential direction, a particularly smooth adjustment of the carrier part about the toe and/or camber angle in the vehicle transverse direction.

Preferred refinements of the invention are disclosed in the dependent claims.

According to the invention, a bearing point is formed radially outwards of the rotary parts for articulation of the carrier part and the guide part to each other. To support the carrier part that is exposed to a braking torque, the bearing point is designed firm in the wheel-axle circumferential direction. Conversely, the bearing point is designed soft in the vehicle transverse direction for attaining a trouble-free (i.e. smooth when compared to the wheel-axle circumferential direction) adjustment of the carrier part about the toe and/or camber angle. The braking torque support is thus realized only by a single bearing point between the carrier part and the guide part. The bearing point is therefore—as compared to the prior art—significantly more space-beneficial and requires less components when installed in the wheel carrier.

According to a technical realization, the bearing point can be a rubber-metal bearing, which has a firm characteristic in the wheel-axle circumferential direction and a soft characteristic in the vehicle transverse direction. The bearing point can be constructed, by way of example, from a bearing housing and a bearing core, which are each formed in particular on the carrier part and the guide part of same material and in one piece. To provide the bearing transverse softness, the bearing core may be telescopically adjustable over a bearing path between transverse stops in relation to the bearing housing.

As an alternative to the above embodiment, the bearing point between the carrier part and the guide part can be configured as a bearing joint. The bearing joint can include, by way of example, in combination a ball joint formed in one bearing partner (i.e. carrier part or guide part) and a plunging joint formed in the other bearing partner (i.e. guide part or carrier part).

To meet the required functionality, the ball joint assumes in the vehicle transverse direction the required firm configuration. The plunging joint can provide the softness in the vehicle transverse direction as a result of its orientation substantially parallel to the wheel axle.

According to a technical realization, the ball joint can have a joint ball which is swingably mounted in corresponding joint sockets of the one bearing partner (carrier part for example). The joint ball can be extended, for example, by a joint rod which is shiftable substantially without play in a bearing channel of the plunging joint for realizing the transverse softness of the bearing arrangement in the transverse direction.

As an alternative, the ball joint and/or plunging joint can each also be designed as a rubber-metal bearing. The rubber-metal bearings are configured such that the afore-described functionalities of the ball joint and the plunging joint are met.

According to a preferred technical implementation, the wheel-side carrier part of the wheel carrier can be supported via a pivot bearing upon the wheel-side rotary part. In addition, a wheel bearing can be integrated in the wheel-side rotary part. A wheel hub portion of a wheel flange, supporting the vehicle wheel, is rotatably mounted in the wheel bearing. In this case, the wheel-side carrier part supports only the brake caliper and, possibly, the drive motor for the wheel-side rotary part. As a result, the bearing point between the wheel-side rotary part and the wheel-side carrier part is removed from the wheel force flux and relieved from any force. This results in only three bearing points that are positioned in series in the wheel force flux. The fourth bearing point, i.e. the pivot bearing between the wheel-side carrier part and the wheel-side rotary part can be dimensioned in contrast thereto smaller since any forces and torques acting upon this pivot bearing from the brake system for example are much smaller. Furthermore, the removal of the fourth bearing point from the wheel force flux increases the camber stiffness of the bearing assembly, so that the remaining bearing points again can be dimensioned smaller while maintaining the camber stiffness constant. Overall, compared to the art, the demand for installation space and the structural weight of the device are significantly reduced.

Preferably, the wheel-side carrier part can be arranged radially outside the wheel-side rotary part so that the device can be designed particularly compact in axial direction. In this case, the carrier part can be supported via a radially inner bearing surface upon a radial outer bearing surface of the wheel-side rotary part with interposition of the pivot bearing. The wheel-side rotary part may at the same time assume the dual function of forming the outer bearing housing of the wheel bearing. In correspondence thereto, a wheel hub portion may be rotatably mounted radially inwards of the rotary part forming the outer bearing housing and transitions in transverse direction outwardly into a wheel flange supporting the vehicle wheel. The outer bearing races of the wheel bearing may be incorporated directly on the inner circumference of the wheel-side rotary part. It may, however, be preferred in terms of a simpler customer service, to use a wheel bearing that can be dismantled and has bearing outer races that are not directly incorporated on the inner circumference of the wheel-side rotary part.

The axle-side rotary part and the wheel-side rotary part can each be in driving connection with a drive motor. Preferably, the rotary parts can each be components of a gear drive in which the electric motor drives the axle-side and/or wheel-side rotary part via a gear stage. As the rotary parts rotate in a same direction or in opposite directions, the carrier part pivots about a predefined toe and/or camber angle. A particular space-saving arrangement is established, when the wheel-side rotary part has a gear portion which is a component of the afore-mentioned gear drive and arranged, as viewed in axial direction, between the carrier-part support point and the slanted surface of the wheel-side rotary part.

To enable incorporation of the device in a conventional wheel suspension in a simple manner in terms of manufacture, the wheel carrier can have an axle-side guide part. The control arms, the stabilizer coupling points and/or dampers/springs of the wheel suspension of the vehicle can be articulated to the axle-side guide part. In addition, the guide part can be supported on the axle-side rotary part in a dynamically decoupled manner, i.e. via a pivot bearing. The guide part can be arranged radially outside of the axle-side rotary part, like the wheel-side carrier part. In this case, the guide part can be supported via a radially inner bearing surface upon a radial outer bearing surface of the axle-side rotary part with interposition of the pivot bearing. A torque transmitting element can, preferably, be positioned between the carrier part and the guide part, while forming a torque path, in which a torque, in particular a braking torque, is transferred from the carrier part to the guide part, and the axle-side and wheel-side rotary parts are bridged.

The configurations and/or refinements of the invention, as described above and/or set forth in the subclaims may be used individually or also in any combination with one another—except, for example, in cases of unambiguous dependencies or incompatible alternatives.

BRIEF DESCRIPTION OF THE DRAWING

The invention and its advantageous configurations and refinements as well as their advantages will be described in greater detail hereinafter with reference to drawings.

It is shown in:

FIG. 3 a detailed view of a further embodiment of the invention.

DETAILED DESCRIPTION OF PREFERRED EMBODIMENTS

Figure 1:
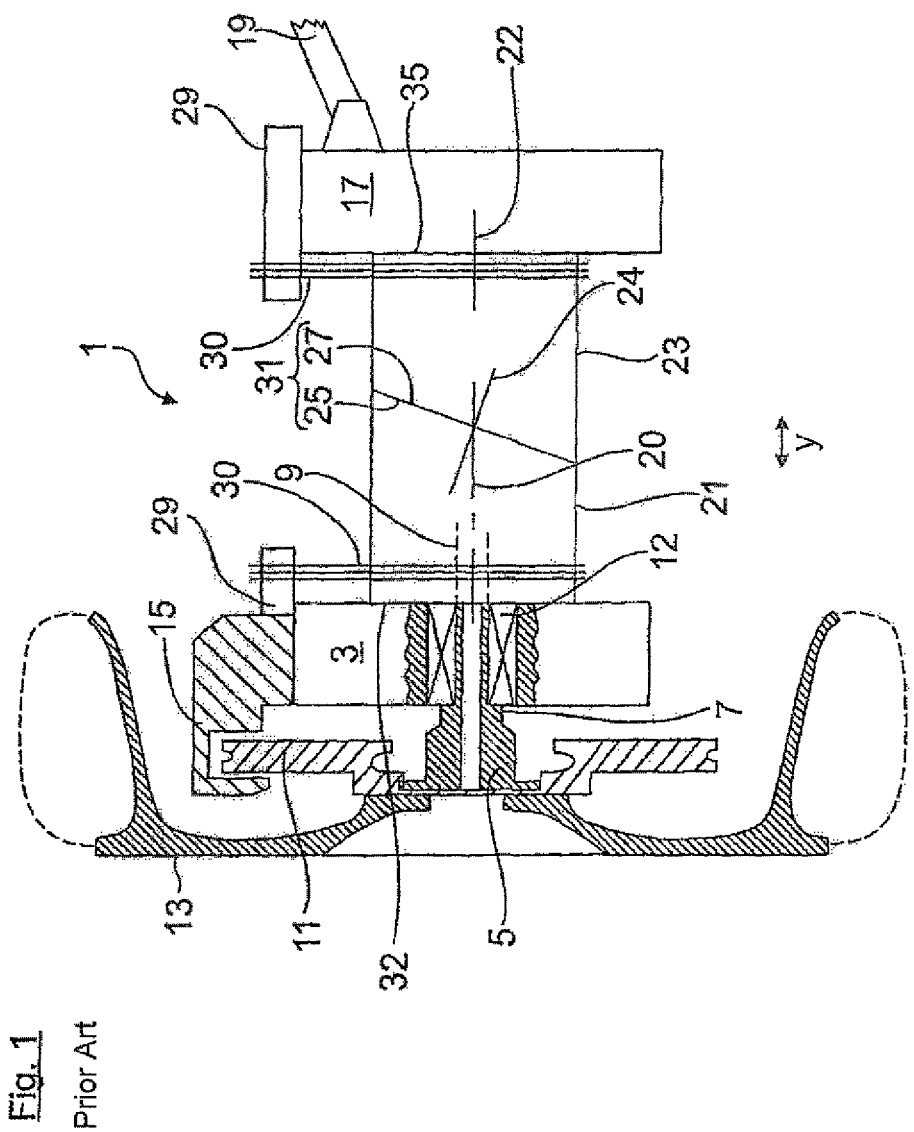
FIG. 1 a principal illustration of a prior art device for adjusting toe and camber angles of a motor vehicle wheel.

For ease of understanding, FIG. 1 shows a rough schematic illustration of a wheel carrier 1 of a vehicle wheel 13 as known in the art and not covered by the invention.

The wheel carrier 1 includes a carrier part 3, in which a wheel flange 5 is rotatably mounted with its hub portion 7 in a wheel bearing 12. A brake disc 11 and a vehicle wheel 13 with its rim are mounted to the wheel flange 5. The brake disc 11 together with a brake caliper 15, mounted on the carrier part, are components of a brake system. Guided through the wheel carrier 1 is a cardan shaft which propels the vehicle wheel 13 and has a constant-velocity joint (shown only in FIG. 2 with reference numeral 9) to which a central screw, also not shown, is threadably engaged, to brace the wheel bearing 12 via the wheel hub 5 and the constant-velocity joint 9.

In addition, the wheel carrier 1 includes a guide part 17 to which a control arm 19 of the wheel suspension is articulated by way of example. Two rotary parts 21, 23 as adjusting elements are provided between the carrier part 3 and the guide part 17. The rotary part 21 is rotatably connected at a bearing point 32 with the carrier part 3 while defining a rotary-part axis 20. The rotary part 23 is connected at a bearing point 35 with the guide part 17 while defining a rotation axis 22. FIG. 1 shows the two rotary parts 21, 23 to be in sliding bearing relative to one another via flat slanted surfaces 25, 27 and rotatably connected with one another via a rotation axis 24. The rotation axis 24 is oriented in FIG. 1 at an incline perpendicular to the slanted surfaces 25, 27 and at a defined angle in relation to the rotation axis 22 of the axle-side rotary part 23.

FIG. 1 shows, by way of example, the rotary-part axis 20 in identical position with the wheel axle. In a departure therefrom, the rotary part 21 can be arranged not coaxially with respect to the wheel axle, but the rotary-part axis 20 and the wheel axle may also be slanted in relation to one another.

Provided to each of the carrier part 3 and the guide part 17 is an electric servomotor 29 which is in driving relation with the rotary parts 21, 23 via gear drives 30. The servomotors 29 are able to rotate the two rotary parts 21, 23 in a same direction or in opposite directions in both rotation directions, so that the carrier part 3 executes a pivotal movement or wobble movement about a momentary pole MP (FIGS. 2 to 5) in relation to the guide part 17 to thereby correspondingly modify the toe angle and/or camber angle of the vehicle wheel 13.

In FIG. 1, the bearing point 32 is thus formed between the wheel-side carrier part 3 and the wheel-side rotary part 21, the bearing point 31, comprised of the two slanted surfaces 25, 27, is thus formed between the two rotary parts 21, 23, and a further bearing point 35 is thus formed between the axle-side rotary part 23 and the guide part 17.

Figure 2:
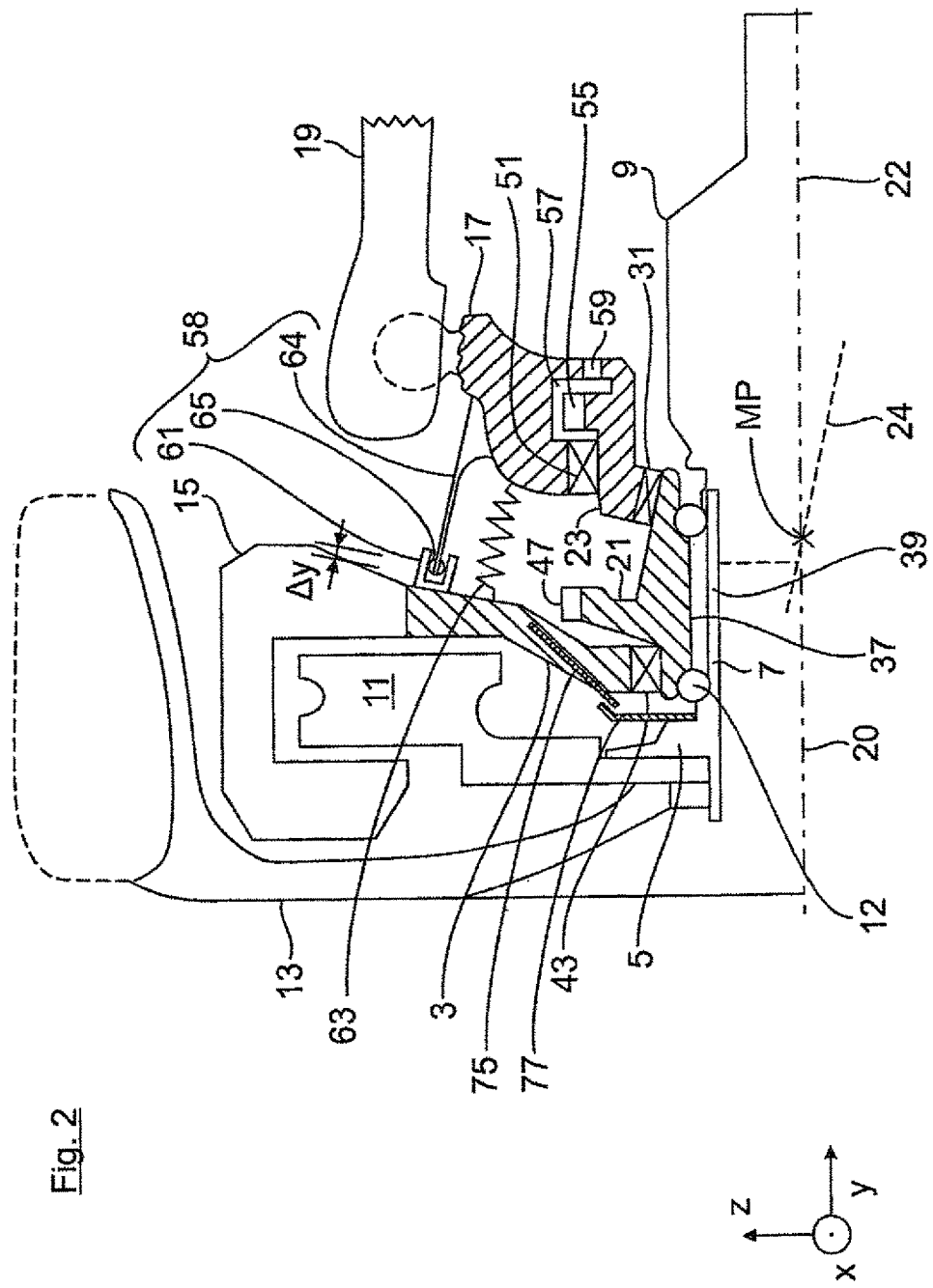
FIG. 2 a half-section of the upper half of device according to the invention by way of a representational configuration.

FIG. 2 shows the wheel carrier 1 according to the invention. In contrast to FIG. 1, the two rotary parts 21, 23 do no longer contact each other via flat slanted surfaces 25, 27 in order to define the inclined rotation axis 24, but via a pivot bearing point 31. This pivot bearing point may be realized for example as rolling-contact bearing or sliding bearing or also a combination of several of these bearings, which substantially maintain all translation and rotation directions up to the rotation axis. This generalization is true also for the other bearing points, described in the figures.

FIG. 2 shows in addition that the wheel bearing 12 is no longer directly integrated in the wheel-side carrier part 3, but rather directly within the wheel-side rotary part 21. In FIG. 2, the outer bearing races and the inner bearing races of the wheel bearing 12 are incorporated, purely by way of example, directly in the inner circumference 37 of the wheel-side rotary part 21 and directly in the outer circumference 39 of the hub portion 7 of the wheel flange 5. Correspondingly, the wheel-side rotary part 21 in FIG. 2 assumes a dual function also as an outer bearing housing of the wheel bearing 12. At the outer circumference of the wheel-side rotary part 21, the carrier part 3 is supported on the outside in vehicle transverse direction y radially outside upon the wheel-side rotary part 21. The bearing point 43 has to be configured to be able to absorb tilting moments.

Deviating from FIG. 2, a technical implementation is possible that involves a design of the wheel bearing 12 that can be dismantled, and more specifically with a radially outer bearing housing which can be dismantled, i.e. mounted, for example via a press fit or by a screw connection, to the inner circumference of the rotary part 21, and/or with a radially inner bearing housing which can be mounted onto the outer circumference of the wheel hub 5.

As is further apparent from FIG. 2, the bearing point 43 and the pivot bearing point 31 are configured, purely by way of example, on axially opposite sides of the rotary part 21, with a gear portion 47 being positioned there between and forming part of the gear drive 30 (FIG. 1).

The axle-side guide part 17 is supported—analogous to the carrier part 3—to a pivot bearing 51 radially outwards upon the axle-side rotary part 23. In the further course in the vehicle transverse direction y inwardly, a further gear portion 55 is formed, for example, on the outer circumference of the axle-side rotary part 23 and represents also part of the gear drive 30. The gear portion 55 of the axle-side rotary part 23 is positioned in an annular space 57 which is bounded in the vehicle transverse direction y to the outside by the pivot bearing 51 and to the inside by an annular seal 59 which is arranged between the guide part 17 and the axle-side rotary part 23. The annular seal 59 in addition to the mobile seal 63 (i.e. rubber sleeve) is depicted only by way of example. Furthermore, seals may, of course, also be attached at all other bearing points.

In accordance with the invention, the wheel-side carrier part 3 supports—in addition to an electronic parking brake for example—only the brake caliper 15, the drive motor 29 for the wheel-side rotary part 21, and the torque support 61, to be described later, but does no longer support the wheel bearing 12. As a result, the pivot bearing 43 in particular between the carrier part 3 and the wheel-side rotary part 21 is removed from the wheel force flux. In terms of the encountered wheel forces, this results in that three bearing points only are arranged in series, i.e. the wheel bearing 12, the pivot bearing 31 and the support bearing 51, but not the bearing point 43 where the carrier part 3 is supported on the wheel-side rotary part 21. Therefore, the bearing point 43 placed on the wheel-side rotary part 21 can be dimensioned significantly smaller since the wheel forces and torques encountered there are much smaller. By removing the bearing point 43 from the wheel force flux, camber stiffness of the bearing assembly is increased in addition, so that the remaining bearings, i.e. the wheel bearing 12, the pivot bearing 31, and the support bearing 51, can be dimensioned smaller—compared to the state of the art—while maintaining camber stiffness.

As is further apparent from FIG. 2, a bearing point 58 is formed radially outside of the rotary parts 21, 23 for articulation of the carrier part 3 and the guide part 17 upon one another. The bearing point 58 is a rubber-metal bearing which is comprised of a bearing housing 61, formed on the carrier part 3, and a bearing core 64, projecting into the bearing housing and formed on the guide part 17. An elastomer material 65 is provided between the bearing core 64 and the bearing housing 61. The rubber-metal bearing 58 is arranged radially outside of a circumferential rubber sleeve 63 which seals the rotary parts 21, 23 and their bearing points against ingress of dirt.

The rubber-metal bearing 58 has a firm characteristic in the wheel axle circumferential direction and a soft characteristic in the vehicle transverse direction y. To realize the transverse softness, the bearing core 64 is guided in FIG. 2 over a free bearing path Δy between not-shown transverse stops in a telescopically adjustable manner in the bearing housing 64 in the transverse direction y.

To support the carrier part 3, when acted upon by a braking torque, the rubber-metal bearing 58 is configured firmly in the wheel-axle circumferential direction. Conversely, a trouble-free adjustment of the carrier part 3 about the toe angle and/or camber angle is realized by configuring the rubber-metal bearing 58 softly in the vehicle transverse direction y. That means that the rubber-metal bearing 58 is configured sufficiently compliant in the vehicle transverse direction y in order to be prevented from interfering with the wobble movement of the wheel-side rotary part 21 with carrier part 3 coupled thereto.

The rubber-metal bearing 58 acts as a torque bridge via which a torque, in particular a brake torque, can be transmitted from the carrier part 3 to the guide part 17.

In FIG. 3, the bearing point 58 between the carrier part 3 and the guide part 17 is configured not as a rubber-metal bearing, but as a bearing joint. The bearing joint includes in combination a ball joint 65, formed in the carrier part 3, and a plunging joint 66 formed in the guide part 17. The ball and plunging joints 65, 66 may also be formed in the guide part 17 and carrier part 3 vice versa.

The ball joint 64 includes according to FIG. 3 a joint ball 67 which is swingably mounted in corresponding joint sockets 69 of the carrier part 3. The joint ball 67 is supported softly in the rotation direction and rigidly in the transverse direction y. The joint ball 67 is extended in FIG. 3 by a joint rod 71 which, for the realization of the transverse softness of the bearing arrangement in the transverse direction y, is shiftable substantially without play in a bearing channel 73 of the plunging joint 66. The joint rod 71 is thus supported rigidly in the rotation direction and softly in the transverse direction.

The plunging joint 66 can be realized in any manner. Instead of the bearing channel 73 of the plunging joint 66, it is for example possible to provide a bearing rail or a rubber-metal bearing in which the joint rod 71 is received.

Also, the ball joint 65 may also be designed as rubber-metal bearing in which the joint rod 71 is received. Also, both the ball joint 65 and a rubber-metal bearing can be designed such as to have the same functionality, as described above.

As is further apparent from FIG. 2, the wheel carrier includes an ABS sensor 75 with encoder ring 77. The ABS sensor 75 is installed in the carrier part 3, whereas the encoder ring 77 is attached to the wheel flange 5. The arrangement of the ABS sensor 75 and the encoder ring 77 is selected such that a collision with adjacent components, like the rotary parts 21, 23, can be eliminated when adjusting camber and/or toe. Correspondingly, the encoder ring 77 is positioned on the side of the wheel bearing 12 in confronting relation to the vehicle wheel 13, secured to the wheel flange 5 and configured with an outer diameter which is greater as compared to conventional designs. The ABS sensor is mounted in the carrier part 3 in an inclined position.

The invention claimed is:

1. A device for adjusting camber and/or toe of a vehicle wheel of a motor vehicle, said device comprising:
   a wheel carrier including a wheel-side carrier part which is subjected to a brake torque, an axle-side guide part, and an adjusting member arranged between the carrier part and the guide part and configured to swing the carrier part about a wobble point for toe and/or camber adjustment of the vehicle wheel; and
   a bearing point formed radially outside of the adjusting member for articulation of the carrier part and the guide part to one another, said bearing point being configured such as to be firm in a wheel-axle circumferential direction for support of the carrier part, and to be soft in comparison to the wheel-axle circumferential direction to enable adjustment of the carrier part about a toe and/or camber angle in a vehicle transverse direction, wherein the bearing point is a rubber-metal bearing configured to exhibit a firm characteristic in the wheel-axle circumferential direction and a soft characteristic in the vehicle transverse direction.

2. The device of claim 1, wherein the adjusting member includes two rotary parts, with one of the rotary parts being linked to the carrier part and the other one of the rotary parts being linked to the guide part.

3. The device of claim 2, wherein one of the two rotary parts is a wheel-side rotary part, said carrier part being arranged radially outside of the wheel-side rotary part.

4. The device of claim 3, further comprising a further radially inner bearing point configured to support the carrier part upon the wheel-side rotary part.

5. The device of claim 1, wherein the carrier part supports a brake caliper that interacts with a brake disc of the vehicle wheel.

6. A device for adjusting camber and/or toe of a vehicle wheel of a motor vehicle, said device comprising:
   a wheel carrier including a wheel-side carrier part which is subjected to a brake torque, an axle-side guide part, and an adjusting member arranged between the carrier part and the guide part and configured to swing the carrier part about a wobble point for toe and/or camber adjustment of the vehicle wheel; and
   a bearing point formed radially outside of the adjusting member for articulation of the carrier part and the guide part to one another, said bearing point being configured such as to be firm in a wheel-axle circumferential direction for support of the carrier part, and to be soft in comparison to the wheel-axle circumferential direction to enable adjustment of the carrier part about a toe and/or camber angle in a vehicle transverse direction, wherein the bearing point includes a bearing housing linked to the carrier part, a bearing core linked to the guide part, and elastomer material arranged between the bearing housing and the bearing core, said bearing core being telescopically adjustable over a bearing path in relation to the bearing housing so as to provide a bearing transverse softness.

7. The device of claim 6, wherein the bearing core being telescopically adjustable between transverse stops that define the bearing path.

8. The device of claim 6, wherein the bearing housing is formed in one piece with and of same material as the carrier part.

9. The device of claim 6, wherein the bearing core is formed in one piece with and of same material as the guide part.

10. A device for adjusting camber and/or toe of a vehicle wheel of a motor vehicle, said device comprising:
    a wheel carrier including a wheel-side carrier part which is subjected to a brake torque, an axle-side guide part, and an adjusting member arranged between the carrier part and the guide part and configured to swing the carrier part about a wobble point for toe and/or camber adjustment of the vehicle wheel; and
    a bearing point formed radially outside of the adjusting member for articulation of the carrier part and the guide part to one another, said bearing point being configured such as to be firm in a wheel-axle circumferential direction for support of the carrier part, and to be soft in comparison to the wheel-axle circumferential direction to enable adjustment of the carrier part about a toe and/or camber angle in a vehicle transverse direction, wherein the bearing point is arranged between the carrier part and the guide part and configured as a bearing joint which includes a ball joint formed in one member selected from a group consisting of the carrier part and the guide part, and a plunging joint formed in the other member of the group.

11. The device of claim 10, wherein the ball joint is configured soft in a rotation direction and firm in the vehicle transverse direction.

12. The device of claim 10, wherein the plunging joint is configured firm in the rotation direction and soft in the vehicle transverse direction.

13. The device of claim 10, wherein the ball joint includes a joint ball which is swingably mounted in corresponding joint sockets of one member selected from a group consisting of the carrier part and the guide part.

14. The device of claim 10, wherein the ball joint includes a joint ball which is extended by a joint rod that is shiftable substantially without play in a bearing channel of the plunging joint for realizing a transverse softness of the bearing point in the transverse direction.

15. The device of claim 10, wherein the ball joint is a rubber-metal bearing.

16. The device of claim 10, wherein the plunging joint is a rubber-metal bearing.

17. The device of claim 10, wherein the adjusting member includes two rotary parts, with one of the rotary parts being linked to the carrier part and the other one of the rotary parts being linked to the guide part.

18. The device of claim 17, wherein the carrier part supports a brake caliper that interacts with a brake disc of the vehicle wheel.

19. The device of claim 17, wherein one of the two rotary parts is a wheel-side rotary part, said carrier part being arranged radially outside of the wheel-side rotary part.

20. The device of claim 19, further comprising a further radially inner bearing point configured to support the carrier part upon the wheel-side rotary part.

\* \* \* \* \*